M. A. STUBBS.
FERTILIZER DISTRIBUTER.
APPLICATION FILED AUG. 2, 1910.

981,136.

Patented Jan. 10, 1911.
2 SHEETS—SHEET 1.

Marshal A. Stubbs, INVENTOR,

WITNESSES

BY

ATTORNEY

M. A. STUBBS.
FERTILIZER DISTRIBUTER.
APPLICATION FILED AUG. 2, 1910.
981,136.
Patented Jan. 10, 1911.
2 SHEETS—SHEET 2.
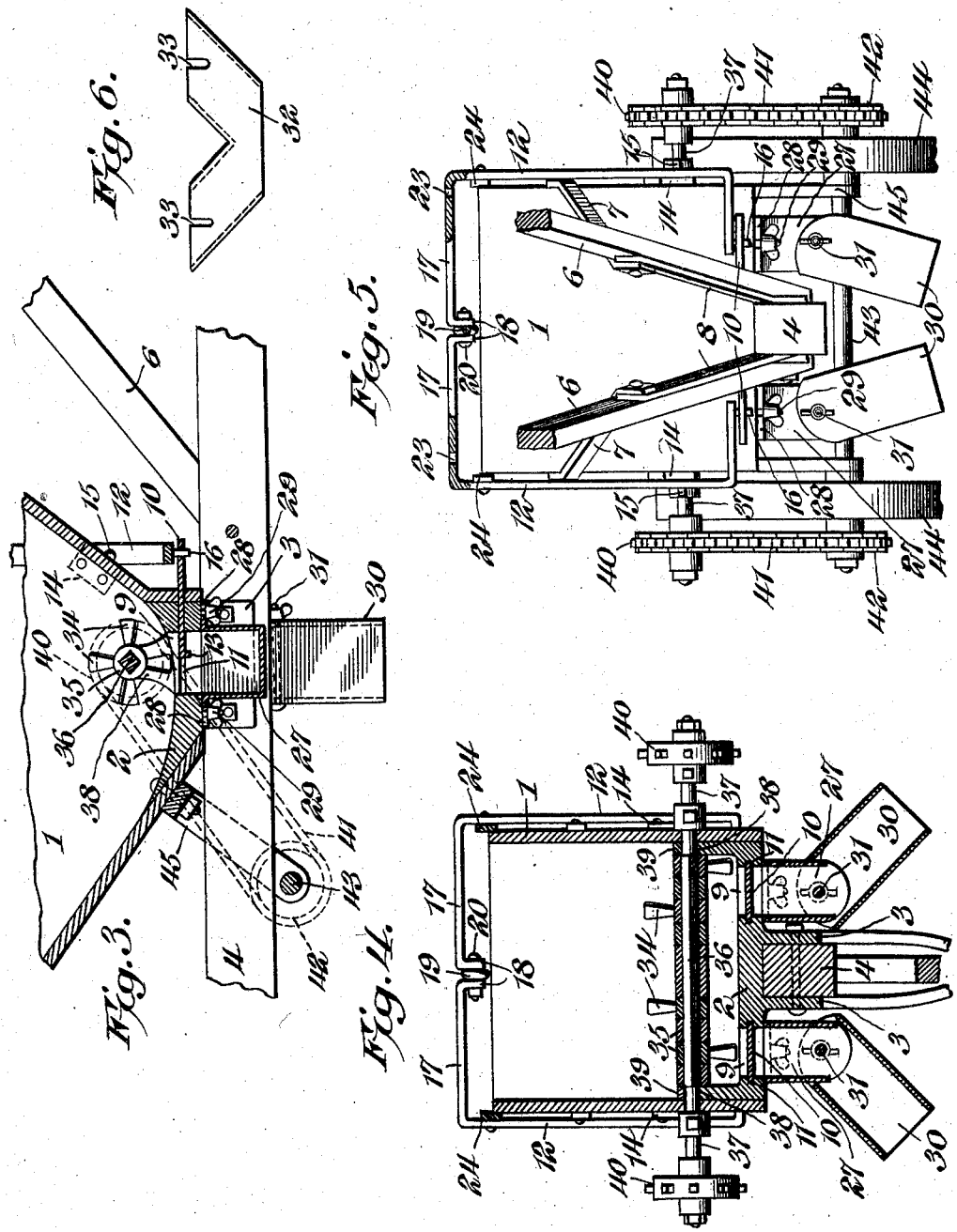
Marshal A. Stubbs, INVENTOR,
WITNESSES
BY
ATTORNEY

UNITED STATES PATENT OFFICE.

MARSHAL ALEXANDER STUBBS, OF DILLON, SOUTH CAROLINA.

FERTILIZER-DISTRIBUTER.

981,136.  Specification of Letters Patent.  Patented Jan. 10, 1911.

Application filed August 2, 1910. Serial No. 575,160.

*To all whom it may concern:*

Be it known that I, MARSHAL A. STUBBS, a citizen of the United States, residing at Dillon, in the county of Dillon and State of South Carolina, have invented a new and useful Fertilizer-Distributer, of which the following is a specification.

The invention relates to improvements in fertilizer distributers.

The object of the present invention is to improve the construction of fertilizer distributers, and to provide a simple, inexpensive and easy running fertilizer distributer, designed particularly for making the second and subsequent application of fertilizer to cotton, corn and other plants, and adapted to apply the fertilizer as closely to the plants as desired and of thereby obviating the necessity of placing the fertilizer around the plants by hand.

A further object of the invention is to provide a fertilizer distributer, capable of being arranged to straddle a row of plants and deliver the fertilizer close to the same at opposite sides thereof, when the plants are the size to admit of the machine traveling over them, and capable, when the plants become too tall to have the fertilizer delivered to them in this manner, of operating between the rows and of discharging the fertilizer at the opposite rows and of plowing down the ridge between the rows and of throwing the soil toward the plants to cover the fertilizer.

Another object of the invention is to enable the fertilizer distributer when arranged for cultivating and distributing the fertilizer between the rows to discharge the fertilizer at either or both sides of the machine as desired.

Furthermore, it is the object of the invention to enable the machine to be arranged for discharging the fertilizer in a single furrow to adapt it for use in the first cultivation of the soil.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
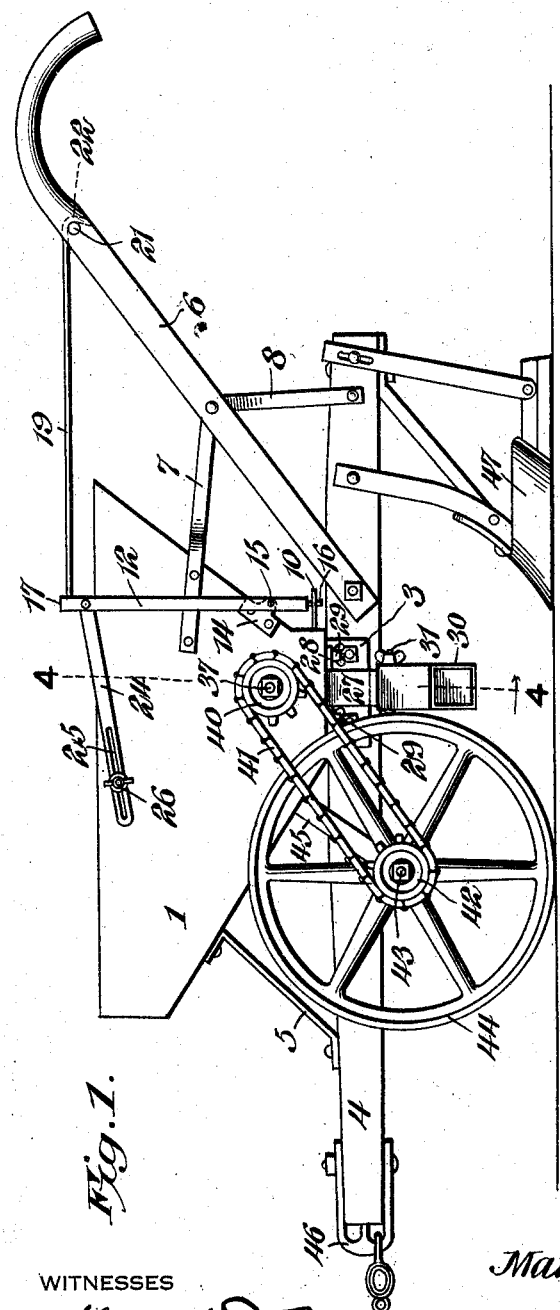
Figure 2:
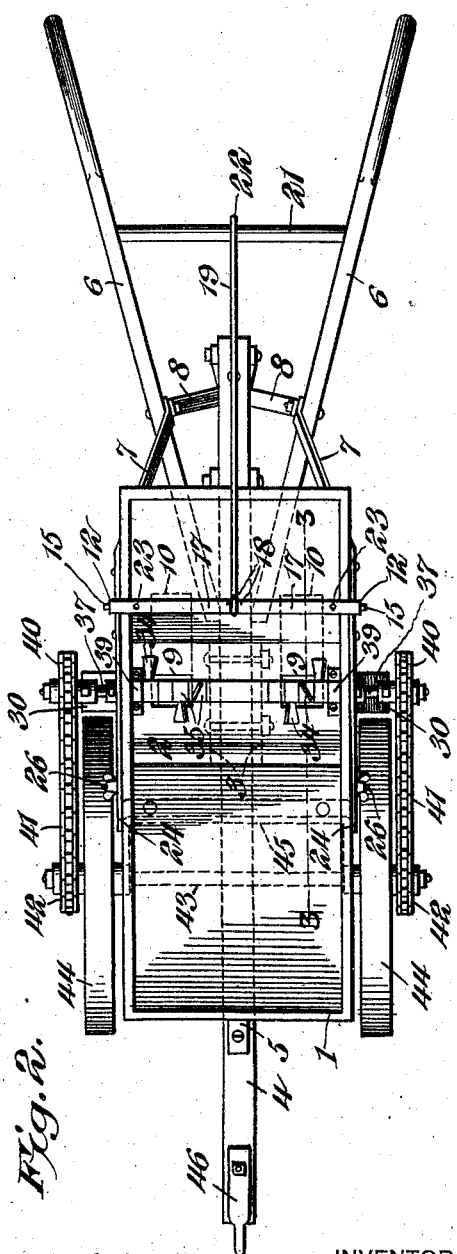

In the drawings:—Figure 1 is a side elevation of a fertilizer distributer, constructed in accordance with this invention, and arranged for distributing the fertilizer to and cultivating the soil between two rows of plants. Fig. 2 is a plan view of the same. Fig. 3 is a longitudinal sectional view on the line 3—3 of Fig. 2. Fig. 4 is a transverse sectional view on the line 4—4 of Fig. 1. Fig. 5 is a rear elevation, partly in section, showing the fertilizer distributer arranged for straddling a row to deliver the fertilizer at opposite sides of the plants. Fig. 6 is a detail view of a spout section for directing the fertilizer into a single furrow.

Like numerals of reference designate corresponding parts in all the figures of the drawings.

In the embodiment of the invention illustrated in the accompanying drawings, 1 designates a tapered hopper, preferably provided with a metallic bottom 2, having spaced depending attaching lugs or flanges 3, located at opposite sides of a plow beam 4 upon which the hopper 1 is mounted. The hopper 1 is seated upon the plow beam at a point intermediate of the ends thereof, and the depending lugs or flanges 3 are bolted, or otherwise secured to the same. The hopper is preferably connected at its front portion with the plow beam by a supporting brace 5, and it is connected at its rear portion with a pair of handle bars 6 by braces 7. The handle bars 6, which are inclined, are secured at their lower ends to the beams at opposite sides thereof, and are braced by upright bars 8, extending upwardly from the rear portion of the plow beam and secured to the handle bars by the fastening devices for attaching the braces 7. The hopper and the handle bars may, however, be secured to the plow beam and braced in any other desired manner.

The metallic bottom 2 of the hopper has a curved or concave upper face and is provided at opposite sides of the beam 4 with outlet openings 9, and the discharge of the fertilizer is controlled by slidable cut-offs 10, consisting of flat metallic plates, operating in horizontal grooves or guide-ways 11 of the bottom 2 and projecting rearwardly beyond the hopper and having exterior portions connected with a pair of levers 12. The front ends 13 of the slidable cut-offs 10 have depending lips or flanges forming stops and arranged to limit the outward movements of the cut-offs. The cut-offs 10 are adapted to be adjusted for controlling the discharge of the fertilizer and for cutting off the flow of the same. The levers 12, which are arranged in an upright position, are pivoted at an intermediate point to plates 14 by bolts 15, or other suitable fastening means, and their lower ends are bent inwardly at right angles and provided with depending studs or projections 16, extending through openings in the exteriorly projecting rear portions of the cut-offs. The levers are provided at their upper ends with inwardly extending integral arms 17, formed by bending the levers inwardly at right angles, and the inner terminals of the arms are bent downward to form spaced lugs 18 between which is pivoted the front end of a longitudinally disposed operating arm 19. The operating arm 19 is provided at its front end with an eye to receive a bolt 20, and its rear portion is supported by a transverse rung 21, which connects the handle bars. The rear end 22 of the operating rod is bent downwardly to form a hook for engaging the rung 21. The bolt 20 is removable and each of the arms 17 is provided at its outer end with a perforation 23, adapted to permit the front end of the operating rod, when the latter is detached, to be connected with one of the arms when it is desired to discharge the fertilizer at one side only. The upper arms of the levers are connected with the sides of the hopper by bars 24, pivoted at their rear ends to the levers and provided at their front ends with longitudinal slots 25, through which pass bolts 26, projecting horizontally from the sides of the hopper and equipped with thumb nuts for enabling the bars 24 to be clamped to secure the cut-offs in any adjustment.

The fertilizer distributer is equipped with a pair of spouts 27, depending from the bottom of the hopper at opposite sides of the beam and provided at their upper ends with horizontal attaching flanges 28, slotted to receive bolts 29, which have thumb nuts for detachably clamping the spouts to the bottom of the hopper. The spouts are provided with lower detachable pivotal sections 30, secured to the upper fixed sections or body portions of the spouts by bolts 31, having thumb nuts for securing the lower sections in pivotal adjustment. The lower sections are detachable to permit a spout section 32 to be applied to the spouts, and they are adapted to swing transversely of the fertilizer distributer to vary the distance between them and to enable them to be arranged in an outwardly or inwardly inclined position to discharge the fertilizer adjacent to two rows of plants when the machine is traveling between the rows, and also to deliver the fertilizer at opposite sides of a single row of plants when the machine is straddling such row. The section 32 is approximately V-shaped and is provided at the upper portions of its sides with slots 33, adapted to receive the bolts 31 to enable the same to secure the section 32 to the upper stationary sections of the spouts. When the approximately V-shaped section is applied in position, the fertilizer of both spouts is discharged centrally of the hopper and may be delivered into a single furrow. By these adjustments, the machine may be arranged for distributing the fertilizer when the soil is first cultivated, and to straddle rows of young plants and to operate between the rows when the plants increase in size. The adjustment of the lower sections 30 of the spouts also adapts the machine to the different widths of the spaces between the rows, which spaces vary from three to five feet.

The feed of the machine is rendered positive by means of a rotary agitator, consisting of a series of radially arranged blades or fingers 34, carried by sleeves or hub portions 35, which are mounted on a squared portion 36 of a transverse shaft. The transverse shaft is also provided with rounded end portions 37, journaled in sectional bearings 38 at opposite sides of the metallic bottom of the hopper. The bearings 38 are formed integral with the bottom of the hopper and extend upwardly to the inner faces of the side walls of the hopper and have bearing recesses in which the rounded portions of the transverse shaft are secured by caps 39, which constitute the upper sections of the bearings. Any number of blades or fingers may be employed, and the shaft is equipped at its ends with opposite sprocket pinions 40, connected by sprocket chains 41 with sprocket pinions 42, mounted on a shaft or axle 43 of a pair of wheels 44. The axle, which extends beneath the plow beam, is journaled in suitable bearings of a yoke 45, secured to the front inclined end wall of the hopper and having its sides arranged at an inclination, as clearly shown in Fig. 3, and provided at their lower ends with bearings for the axle 43. The wheels 44 are preferably provided with broad peripheries to prevent them from sinking into the soil, and as the machine has a double driving, it is light and easy running. The plow beam is equipped at its front edge with a clevis 46, which is placed at right angles to the beam to enable a horse to travel in the furrow or space between the plants when the machine is arranged for straddling a row.

The plow beam is equipped at its rear portion with a cultivating foot or blade, which is preferably in the form of a sweep 47. Any form of cultivating device may be employed, and it is detachably connected with the plow beam by bolts, or other suitable fastening means and is adapted to be removed when the fertilizer distributer is arranged to straddle a row of plants. The fastening devices for mounting the hopper upon the beam and for connecting the same with the handles are detachable, and the hopper may be reversed to arrange the discharge spouts in front of the wheels.

Having thus fully described my invention, what I claim as new and desire to secure by Letters Patent, is:—

1. A fertilizer distributer including a plow beam, a hopper mounted on the plow beam and provided at opposite sides thereof with outlets, spouts depending from and carried by the hopper and composed of fixed upper sections and adjustable lower sections arranged to swing transversely so as to extend inwardly or outwardly to discharge fertilizer at opposite sides of a row of plants or to the plants of two opposite rows, separate clamping means mounted on the fixed sections and rigidly securing the lower sections in their adjustment and permitting an independent adjustment of the same, and a detachable cultivating device mounted on the beam in rear of the cultivator and adapted to be removed when the adjustable sections of the spouts extend inwardly to enable the fertilizer distributer to straddle the row.

2. A fertilizer distributer including a plow beam provided with a cultivating device, a hopper mounted on the plow beam and having a metallic bottom provided at opposite sides of the beam with outlets and having upwardly extending bearings located at the inner faces of the sides of the hopper, said bottom being also provided with spaced depending lugs to fit the plow beam, spouts depending from the hopper at the outlets, wheels supporting the plow beam, and an agitator journaled in the said bearings, and gearing for connecting the agitator with the wheels.

3. A fertilizer distributer including a plow beam, handle bars connected with the beam, a hopper seated upon the plow beam, discharge spouts arranged at opposite sides of the plow beam, cut-offs for controlling the flow of material, upright levers pivoted at an intermediate point to the hopper at opposite sides thereof and connected at their lower arms with the cut-offs and provided at their upper ends with inwardly extending arms having spaced terminal lugs, an operating rod supported by the handle bars and extending between the lugs, fastening means detachably securing the operating rod to the lugs and adapted to fasten the rod to either of the said inwardly extending arms, bars connected with the levers and provided with longitudinal slots, and fastening means mounted on the hopper and operating in the slots to clamp the cut-offs in their adjustment.

In testimony, that I claim the foregoing as my own, I have hereto affixed my signature in the presence of two witnesses.

MARSHAL ALEXANDER STUBBS.

Witnesses:
W. T. BETHEO,
J. W. SPRUNT.